INVENTOR.
JOHN I. YELLOTT
BY Gardner J. O'Boyle

Aug. 25, 1964 J. I. YELLOTT 3,145,568

SOLAR RADIATION MEASURING DEVICE

Filed Aug. 15, 1961 2 Sheets-Sheet 2

INVENTOR.
JOHN I. YELLOTT

BY

Gardner J. O'Boyle

United States Patent Office 3,145,568

Patented Aug. 25, 1964

3,145,568

SOLAR RADIATION MEASURING DEVICE

John I. Yellott, Phoenix, Ariz., assignor to John Yellott Engineering Associates, Inc., Phoenix, Ariz.

Filed Aug. 15, 1961, Ser. No. 131,531
4 Claims. (Cl. 73—355)

My invention relates to a device for electrically measuring solar radiation.

One of the objects of my invention is to provide a construction of device for measuring solar radiation having means to automatically compensate for temperature variations so as to always render accurate measurements.

Another object of my invention is to provide a construction of electrical circuit for measuring solar radiation wherein the critical circuit components are disposed to assume the same temperature to eliminate erroneous solar radiation measurements caused by differences in temperature between critical circuit components.

Another object of my invention is to provide a construction of a solar radiation measuring circuit wherein the output measuring parameter will vary with the intensity of solar radiation detected by the circuit but is compensated to remain independent of temperature variations.

Still another object of my invention is to provide a construction of electrical circuit which can be used either as a pyranometer or pyrheliometer device, and wherein one of the circuit parameters is designed to vary in negative proportion to rising temperatures to render accurate solar radiation measurements.

Other and further objects of the invention reside in the construction of pyrheliometer set forth in the modified form of the invention and will become apparent by reference to the specification hereinafter following by reference to the accompanying drawings in which.

Figure 1:
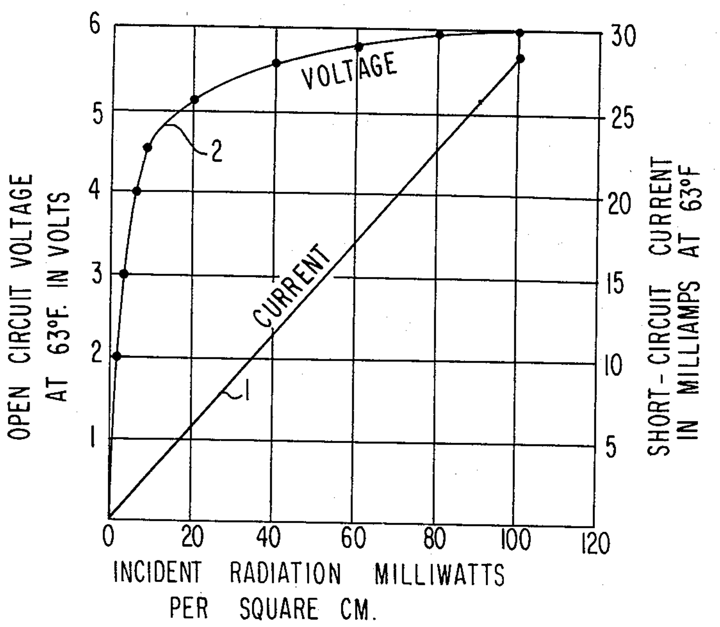
FIG. 1 is a graph of voltage and current versus incident radiation showing the operating characteristics of a typical silicon solar cell at 63° F.

In present devices for measuring total solar radiation and/or devices for measuring only the direct radiation from the sun, erroneous solar radiation measurements are obtained due to the fact that the measuring parameters undergo variations as the temperature of the solar cell increases due to the cell absorbing and converting to heat some of the solar radiation or sunshine which falls upon the cell. The output characteristics of a typical silicon solar cell with varying intensity of received solar radiation or sunshine are shown by the current and voltage curves in FIG. 1. These curves show the voltage and current response of the solar cell at a fixed cell temperature of 63° F. It will be noted from curve 1 that the short circuit current is a linear function of received solar radiation or sunshine intensity, while the open circuit voltage of curve 2 is an exponential function of the solar radiation received by the cell. Experimentation has shown that the open circuit or output voltage of a silicon solar cell also varies to a very noticeable degree with variations in temperature. By way of illustration the open circuit voltage will drop from a maximum of approximately 0.6 volt at 63° F. to as low as 0.2 volt at 160° F. On the other hand, it has been found that the short circuit current of the silicon solar cell changes only very slightly with temperature variations and the output current change is in a positive, rather than in a negative, direction as temperatures are increased. Thus, although the silicon cell will give a linear response to variations in received solar energy the linear response is obtained only if the temperature of the solar cell is maintained constant. However, as stated, as the intensity of the solar radiation or sunshine received by the cell rises, the cell temperature also rises, and, as shown in FIG. 2, the rise in cell temperature causes a non-linear response by the solar cell to variations in received solar energy as indicated by the the curves in FIG. 2.

Figure 2:
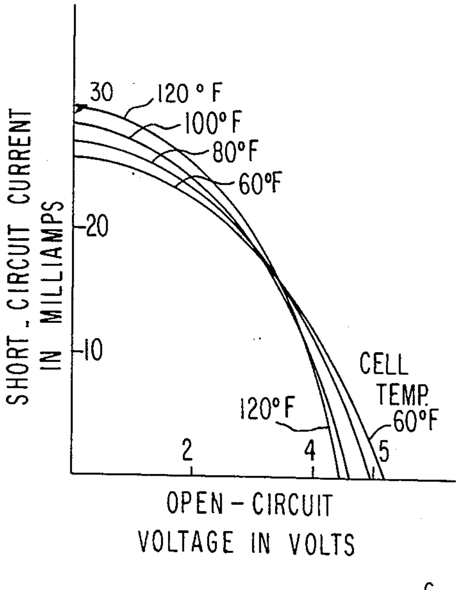
FIG. 2 is a graphic plot of short circuit current versus open circuit output voltage of a typical silicon solar cell, the graph showing several curves at various cell temperatures to show the variation of the cell output characteristics with cell temperature.

In FIG. 2, short circuit current of the solar cell in milliamps has been plotted as a function of open circuit voltage of the cell in volts, for cell temperatures of 60, 80, 100 and 120° F. It will be noted from these curves that the solar cell short circuit current rises very slightly with rising temperatures; whereas, the solar cell open circuit voltage drops considerably with rising temperatures. Thus if it is desired to utilize the short circuit current as a circuit parameter for measuring solar radiation, it is necessary to find some means by which to offset the tendency of the short circuit current to rise with rising temperatures and constant insolation. The electrical circuit of the present invention provides such a means for offsetting the rise in short circuit current with rising temperatures so as to render an instrument capable of providing accurate measurements of solar radiation.

Figure 3:
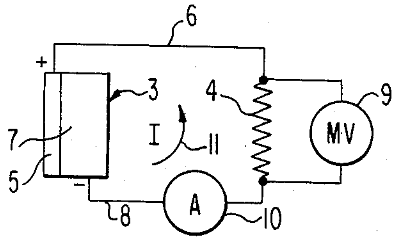
FIG. 3 is an electrical circuit schematic diagram showing the type of solar cell circuit utilized in securing the data for the curves of FIG. 2.

The basic circuit of the present invention is shown in FIG. 3, wherein a silicon solar cell, indicated at 3, is connected to a load resistor 4 so that one end of the resistor is connected to the positive terminal or the p-type semi-conductor layer 5 by means of electrical conductor 6, and the other end of the load resistor is connected to the negative terminal or n-type solar cell semi-conductor layer 7 by means of conductor 8.

Figure 4:
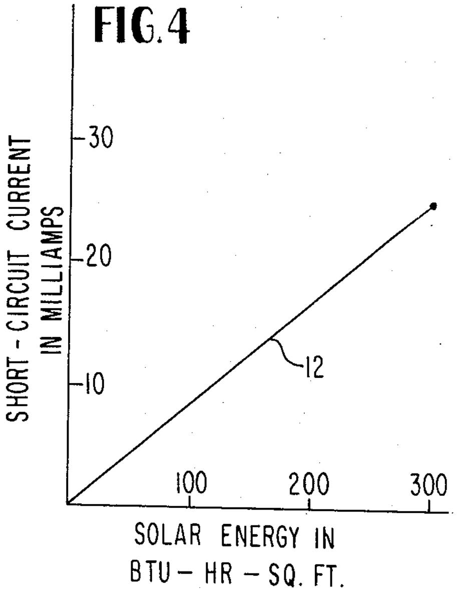
FIG. 4 is a graphic plot of solar cell short circuit current in milliamperes versus solar radiation energy in B.t.u.'s per hour per square foot at constant cell temperature.

A millivoltmeter 9 is connected in parallel with resistor 4 for measuring a voltage drop across the same, and for test purposes a milliammeter 10 may be connected in series with resistor 4 and conductor 8, as shown. When sunlight strikes the surface of the solar cell, it knocks out electrons from the crystal lattice in the vicinity of the p-n junction between the semi-conductor layers 5 and 7 and produces electron-hole pairs. In so doing, it upsets the equilibrium established between the n-type semi-conductor silicon layer 7 and the p-type semi-conductor silicon layer 5. Electrons are pulled across the junction into the n-type semi-conductor silicon layer and holes are pulled into the p-type semi-conductor silicon layer. Electrons then stream from the negative terminal 7 by way of conductor 8, resistor 4, and conductor 6 to the positive terminal 5 as shown at 11 in FIG. 3. Current will thus flow through the load resistor 4, in this manner, as long as sunlight or solar radiation is received by the solar cell 3. When the resistor 4 is made quite small in the order of approximately one-half ohm, the short circuit cell current in milliamps will vary linearly with received solar radiation intensity as shown by the graph 12 in FIG. 4, as long as the temperature remains constant. The voltage across the resistor 4 will vary with varying intensity of solar radiation received by the cell 3, but by making the resistance of resitor 4 change in negative proportion to the cell temperature, the tendency of the cell current to rise as the cell gets warmer from absorbed radiation can be offset.

Figure 7:
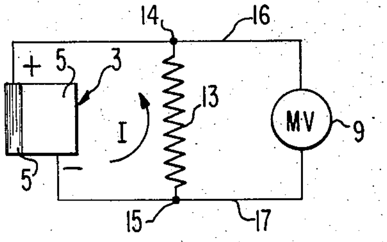
FIG. 7 is a schematic diagram showing the electrical circuit of the invention.

Normally, the resistance of resistor 4 would increase as its temperature increases, and the voltage across the resistance would also rise when a standard type resistor having a positive temperature coefficient of resistance is utilized. In the solar radiation measuring circuit of the present invention a resistor wire, constructed of material having a negative temperature coefficient of resistance, is utilized so that the voltage drop across the resistor will remain steady, at fixed insolation, or for certain intensity of received solar radiation, over a wide temperature range. Therefore, the temperature of the cell and the resistor 4 may vary due to heat absorbed from solar energy striking the cell without effecting the output parameter, such as the voltage drop across resistor 4, which is being utilized as the output parameter for measuring intensity of solar radiation. A schematic of the circuit of the invention is shown in FIG. 7 wherein reference numeral 13 represents the resistive load element constructed of a material having a negative temperature coefficient of resistance, such as manganin. Manganin is an alloy containing 84% copper, 12% manganese, and 4% nickel, for which the average temperature coefficient of resistance is −0.000021 in the temperature range between 25° C. and 100° C. (approximately 75°–212° F.). Among the other materials having negative temperature coefficients of resistance, which may be utilized in the present invention, are an alloy consisting of 60% copper and 40% nickel; carbon; and a copper-manganese-nickel alloy consisting of 73% copper, 24% manganese and 3% nickel. Of these materials manganin is preferred since it is presently readily available on the commercial market, but it is to be understood that other types of material having negative temperature cofficients of resistance can also be utilized.

Figure 5:
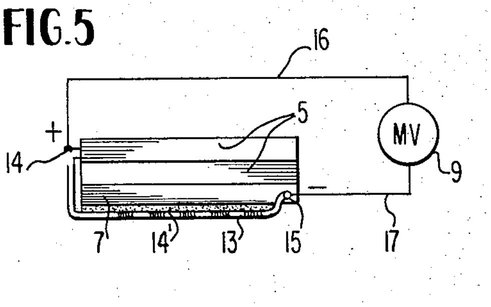
FIG. 5 is a side elevational view showing the arrangement of components in the circuit of the present invention.
Figure 6:
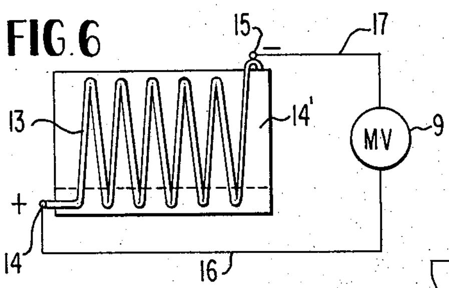
FIG. 6 is a bottom plan view of the circuit components shown in FIG. 5.

In order to acquire an accurate measurement of solar radiation from the circuit of my invention, it is necessary that the resistor element 13 assumes the same temperature as the silicon solar cell 3. This can be done by mounting the resistor 13 in close relation to, such as beneath, the solar cell; but in the preferred form of the invention, as shown in FIGS. 5 and 6, the resistor wire 13 is disposed in direct thermal contact with the underside of semi-conductor layer 7 by cementing the resistor 13 directly therto by means of an adhesive layer, or the like, indicated at 14′. The adhesive layer 14′ acts as an electrical insulation barrier between the semi-conductor layer 7, and the resistor 13, and if desired an additional layer of electrical insulation material can be disposed between the silicon cell and the resistor element. The millivolt measuring meter 9 is then connected to the junctions 14 and 15 of the resistor 13 and the silicon solar cell 3 by means of conductors 16 and 17. Thus, with the circuit component compactly disposed in thermal contact with each other as shown in FIGS. 5 and 6, the temperature of the resistor 13 will rise and fall in exactly the same manner as the silicon solar cell itself, thereby providing automatic temperature compensation to the solar radiation measuring circuit. The output of the cell can be read either as the actual milliamps of short circuit current from a milliammeter disposed in the circuit at 10, in FIG. 3, or as the millivolt drop, across the resistance 13 as measured by a millivoltmeter disposed in the circuit as shown at 9 in FIGS. 3 and 7. The use of the millivoltmeter circuit arrangement as shown in FIG. 7 is the preferred form of circuit structure, since millivolt recorders are relatively plentiful and inexpensive on the commercial market, but it is to be understood that an ammeter, as shown at 10, can be utilized in lieu of a millivoltmeter for securing the solar radiation intensity measurements.

Figure 8:
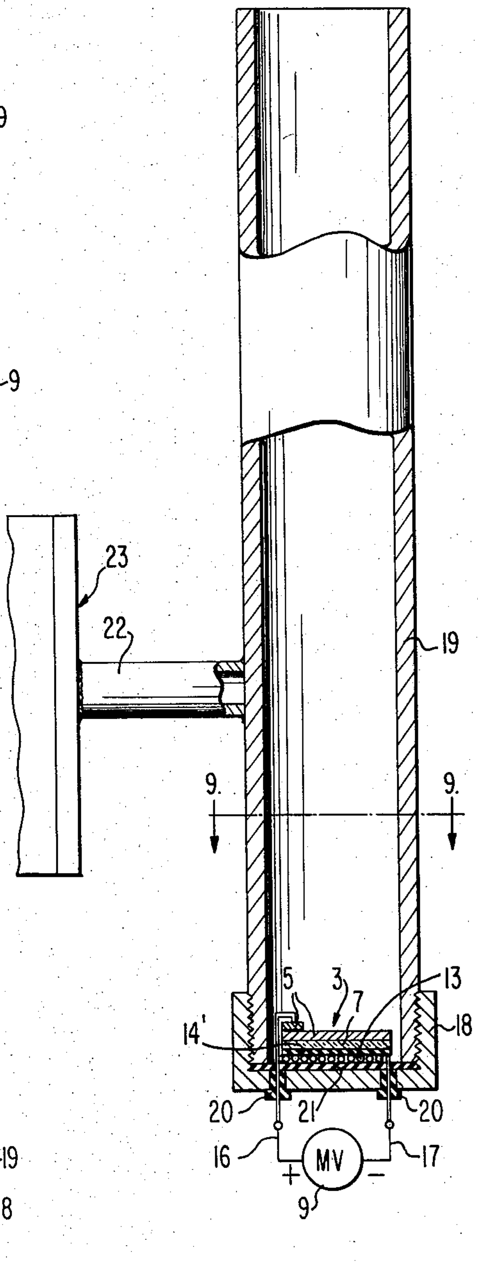
FIG. 8 is a side view in vertical section showing the circuit of the invention disposed within a tubular member to provide a pyrheliometer.
Figure 9:
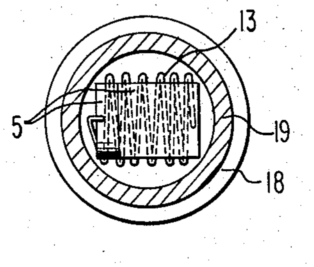
FIG. 9 is a cross-sectional view taken substantially along line 9—9 of FIG. 8.

The device as shown in FIGS. 3, 5–7, used by itself, constitutes a pyranometer which will measure the intensity of the total solar radiation emanating from the sky, including the direct radiation from the sun. In the modified form of my invention shown in FIGS. 8 and 9, I show the circuit of the invention in combination with a structure to provide a pyrheliometer for measuring only the intensity of the direct radiation from the sun to the exclusion of other diffuse radiation from the sky. In the latter form of my invention shown in FIGS. 8 and 9, the radiation measuring circuit is mounted on an internally threaded cup member 18 which is threaded on to the base of a cylindrical tube 19 having its opposite end open to the sky. The circuit elements 3 and 13 are insulated from cup 18 by means of insulation member 21 disposed in the bottom of the cup and intermediate the cup and circuit elements. The cup 18 closes one end of the tube and provides access passages therein, carrying insulator members 20 so as to enable passage of wires 16 and 17 therethrough to connect the exteriorly disposed millivoltmeter 9 to the interiorly disposed circuit components 3 and 13. If desired, the tube 19 can be mechanically connected through a coupling 22 to a device which automatically follows the sun as shown at 23. The open end of the tube is directed directly toward the sun so that the walls of the tube exclude all other diffuse radiation from the sky so that the surface of the cell 3 will receive only the direct rays from the sun itself, thereby providing a simple construction of pyrheliometer.

Thus, in both forms of the invention, utilizing a low value resistor element constructed of a material having a negative temperature coefficient of resistance, the output measurement indicated by the meter will be a linear function of the intensity of solar radiation received by the cell and the meter itself can be calibrated directly in units of solar energy, such as incident radiation in milliwatts per square centimeter, or B.t.u.'s per hour per square foot. If the meter is not calibrated in such units, it is an easy job to interpolate the millivolt or milliamp reading obtained into units of solar energy by use of appropriate curves or tables.

While I have shown and described preferred embodiments of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A pyrheliometer comprising, an elongated tube having a closed bottom end and an open end to be directed towards the sun, a silicon photovoltaic semiconductor cell responsive to variations in solar radiation intensity disposed in the closed bottom end of said tube, resistor means having a resistance value on the order of half an ohm and having a negative temperature coefficient of resistance electrically connected across said semiconductor means to compensate the output thereof from variations due to changing temperatures of said cell, said resistor means being connected in said tube in thermal conducting relation with said semiconductor cell, and meter means disposed exteriorly of said tube and electrically connected with said semiconductor means and said resistor means through passages provided through the closed bottom end of the tube to render an indication of intensity of the direct rays from the sun, said meter means comprising a millivoltmeter connected across the resistor means so that the short circuit current of the cell during operation is read in terms of millivolts, said short circuit current being proportional to the intensity of the solar radiation to which the cell is exposed.

2. A solar radiation measuring circuit comprising in combination a single semiconductor responsive to variations in intensity of solar radiation, means connected to said semiconductor to compensate the output thereof from variations due to changing temperatures of said semiconductor during operation, said means comprising a resistor element having a negative temperature coefficient and a resistance value on the order of half an ohm, and meter means connected with said semiconductor and said resistor element in such a manner that the calibrated indications thereon are proportional to the intensity of the solar radiation to which the semiconductor is exposed.

3. A solar radiation measuring circuit comprising in combination a single silicon, photovoltaic, semiconductor cell responsive to variations in intensity of solar radiation, a low resistance element having a negative temperature coefficient connected across the cell to compensate the output thereof from variations due to changing temperatures of the cell during operation, said resistance element having a resistance value on the order of a half an ohm, and a millivoltmeter connected across the said resistance element, so that the short-circuit current of the cell is read in terms of millivolts, said short circuit current being proportional to the intensity of the solar radiation to which the cell is exposed.

4. An electric circuit for measuring solar radiation intensity comprising a single, silicon photovoltaic semiconductor cell responsive to variations in intensity of solar radiation, a low resistance element having a negative temperature coefficient connected across the cell to compensate the output thereof from variations due to changing temperatures of the cell during operation, said resistance element having a resistance value on the order of a half an ohm, means to connect the resistance element to said cell in thermal conducting relationship, and a millivoltmeter connected across the resistance element, so that the short-circuit current of the cell is read in terms of millivolts, said short circuit current being proportional to the intensity of the solar radiation to which the cell is exposed.

References Cited in the file of this patent

UNITED STATES PATENTS

| | | |
|---|---|---|
| 1,546,264 | Story | July 14, 1925 |
| 2,098,650 | Stein | Nov. 9, 1937 |
| 2,547,173 | Rittner | Apr. 3, 1951 |
| 2,846,592 | Rutz | Aug. 5, 1958 |
| 3,001,077 | Van Overbeek | Sept. 19, 1961 |
| 3,024,695 | Nisbet | Mar. 13, 1962 |

OTHER REFERENCES

"A Radiation Pyrometer" by William H. Earhart, R.C.A. Technical Notes, Number 56, received at Patent Office December 2, 1957.

Thermistors—A Survey of Their Application, in "Instrument Practice," October 1959.

Aronson: Resistance Measurement, in "Instruments & Control Systems," vol. 32, September 1959.